United States Patent
Ageishi et al.

(10) Patent No.: US 6,457,096 B1
(45) Date of Patent: *Sep. 24, 2002

(54) REDUNDANT RECORDING DISK DEVICE AND DATA PROCESSING METHOD USING PLURAL LOGICAL DISKS WITH MIRRORED DATA STORED WITH A PREDETERMINED PHASE-OFFSET

(75) Inventors: Narutoshi Ageishi, Ichinomiya (JP); Motoshi Suzuki, Nishikasugai (JP); Yuichi Kato, Obu (JP)

(73) Assignee: Matsushita Electric Industrial Co., Ltd., Osaka-fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,463

(22) Filed: Oct. 21, 1999

(30) Foreign Application Priority Data

Oct. 22, 1998 (JP) .............................................. 10-300632

(51) Int. Cl.[7] .......................... G06F 12/00; G06F 13/00; G11B 5/09
(52) U.S. Cl. .......................... 711/112; 711/114; 711/162; 360/47; 369/30.01; 369/30.19; 369/30.2; 714/6
(58) Field of Search .......................... 711/111, 112, 114, 711/162; 714/6; 369/84, 178, 30, 32, 30.01, 30.19, 30.2, 32.01, 178.01; 360/75, 78.04, 47, 48, 98.01

(56) References Cited

U.S. PATENT DOCUMENTS

| 5,422,761 | A | * | 6/1995 | Anderson et al. .............. 360/47 |
| 5,432,922 | A | * | 7/1995 | Polyzois et al. ............... 714/6 |
| 5,463,758 | A | * | 10/1995 | Ottesen ....................... 711/114 |
| 5,761,166 | A | * | 6/1998 | Sedlmayr et al. ............. 360/69 |
| 6,018,790 | A | * | 1/2000 | Itoh et al. ................... 711/114 |

FOREIGN PATENT DOCUMENTS

JP 6-267195 9/1994

* cited by examiner

*Primary Examiner*—Glenn Gossage
(74) *Attorney, Agent, or Firm*—Wenderoth, Lind & Ponack, L.L.P.

(57) ABSTRACT

A redundant recording disk device includes a first logical sub-disk and a second logical sub-disk. Mirrored redundant data are recorded such that a recording position on the first logical sub-disk and a recording position on the second logical sub-disk are positions on a corresponding radius and have a phase difference of 180 degrees around respective rotation axes of the disks with respect to one data. Therefore, the practical use of the disk device can be continued even when one recording surface is not usable because of a fault, and the access speed of the disk can be increased when there is no fault since the mirrored data which have been written with a predetermined phase-offset into the different recording surfaces may be read out in a parallel manner.

18 Claims, 8 Drawing Sheets

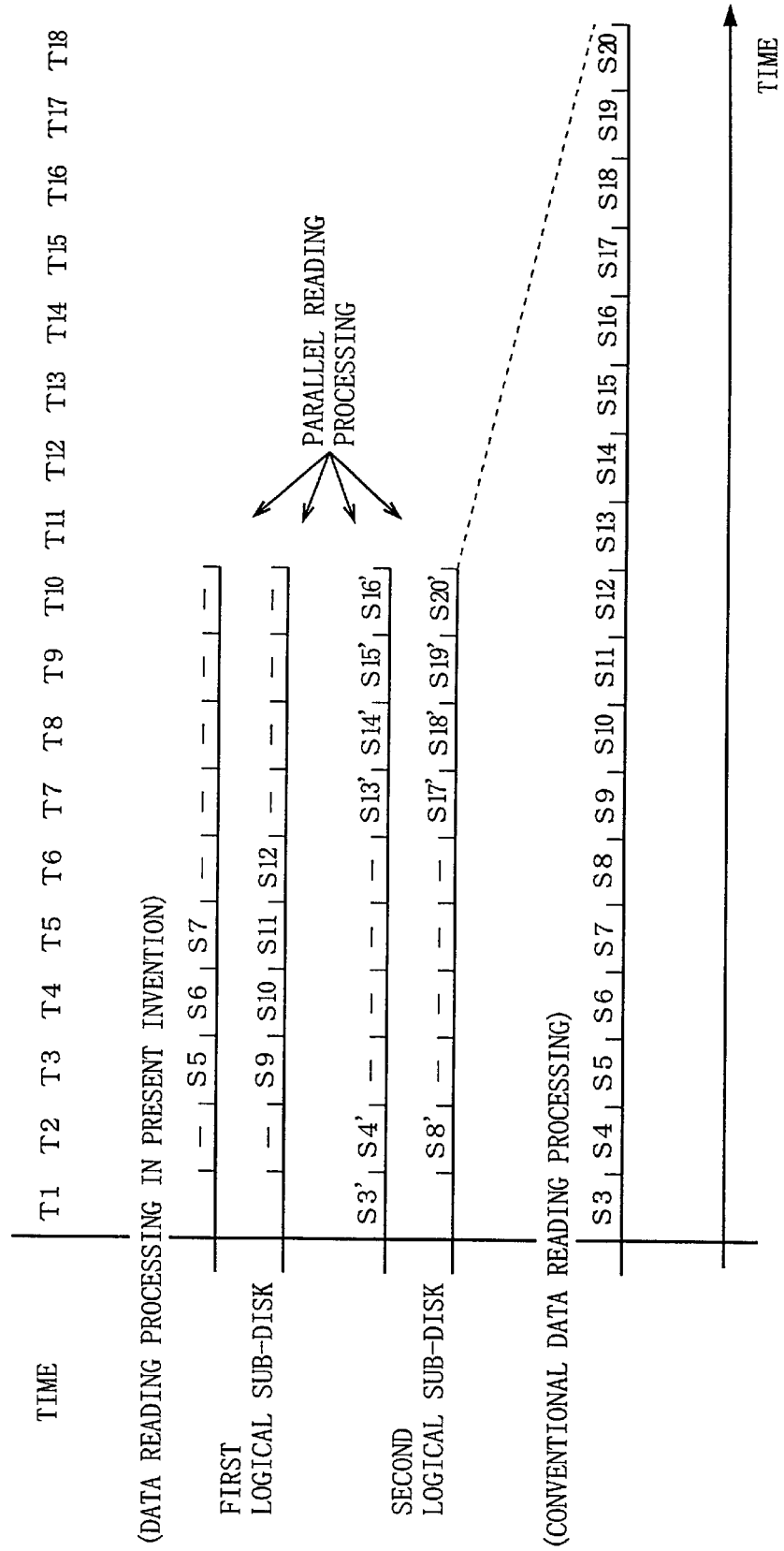

REDUNDANT RECORDING DISK DEVICE AND DATA PROCESSING METHOD USING PLURAL LOGICAL DISKS WITH MIRRORED DATA STORED WITH A PREDETERMINED PHASE-OFFSET

BACKGROUND OF THE INVENTION

1. Field of the Invention

The present invention relates generally to a redundant recording disk device and a data processing method used therefor, and more particularly, to a disk device providing shortened access time and having improved fault resistance by performing redundant recording. The present invention also relates to a method of data writing/reading processing performed in the disk device.

2. Description of the Background Art

In a data processing system, a large problem is that information written into a disk device cannot be read out because of a fault or the like.

As measures to solve the problem, a technique referred to as RAID (Redundant Array of Inexpensive Disks) conventionally exists, which copes with the problem by providing a plurality of disk devices in a data processing system and writing predetermined redundant data into the plurality of disk devices.

The RAID system is for restoring, when one of the plurality of disk devices cannot be accessed upon failing, data recorded in the failing disk device on the basis of data recorded in the remaining disk devices.

As a system using a single disk device, a disk device for performing redundant recording, that is, writing mirrored data on the same track on a recording surface of a disk (a recording medium in the disk device) is disclosed in Japanese Patent Laying-Open No. 6-267195 (hereinafter referred to as a prior document).

According to the disk device described in the prior document, by performing the redundant recording, even when one of the data that is mirrored and recorded cannot be accessed because a fault occurs in a part of the disk, a deficit in the recorded data can be avoided by accessing the other recorded data. In the disk device described in the prior document, when no fault occurs in the disk, the performance of the disk device can be improved by reducing rotational latency in data reading by half.

In order to use the above-mentioned RAID system, however, a large-scale data processing system which is provided with a plurality of disk devices must be constructed. Therefore, it cannot be said that the RAID system is useful in all system environments.

Also, in the disk device described in the prior document, the redundant recording is performed on the same recording surface. When a fault occurs in the whole of one recording surface by a fault in a recording head or the like, therefore, it is impossible to avoid a deficit in information.

SUMMARY OF THE INVENTION

Therefore, an object of the present invention is to provide a disk device capable of continuing practical use as a disk device even when one recording surface is not usable because of a fault, although it is a single disk device, and increasing the access speed of a disk when there is no fault, and a data processing method used therefor.

The present invention has the following features to achieve the above-mentioned object.

A first aspect of the present invention is directed to a redundant recording disk device for writing data to and reading data from parallel tracks on a plurality of disks, comprising:

a plurality of disks which are rotated in synchronization with each other;

a plurality of recording heads respectively corresponding to the plurality of disks for writing and reading data to and from respective recording surfaces among the disks; and control means for controlling the positions of the recording heads on the recording surfaces and the writing and reading of the data, the control means carrying out, when arbitrary data is written, control such that mirrored data are written into positions on the same cylinder, i.e., a corresponding radius, on the plurality of disks, on the different recording surfaces, and having a predetermined phase difference around respective rotation axes of the plurality of disks, while carrying out, when the written arbitrary data is read out, control such that the mirrored data which have been written into the different recording surfaces are read out in a parallel manner.

As described above, in the first aspect, a mirrored pair of data are written into two different disks (recording surfaces), respectively, for each data to be written. Even if either one of the disks cannot be accessed upon failing, therefore, the other disk can be accessed to read out the data. Further, the data are read out in a parallel manner. In a normal case where there is no fault, therefore, read time is shortened, thereby making it possible to read out the data at higher speed.

According to a second aspect, in the first aspect, the plurality of disks are divided into two groups by the recording surface when the disks are even in number, and the two groups are respectively constructed as logical disks, the control means carrying out control such that the mirrored data are written and read to and from the two logical disks constructed.

As described above, in the second aspect, the content of one disk is logically divided into two, to constitute two logical sub-disks in the first aspect. The mirrored data are written into the two logical sub-disks (recording surfaces) for each data to be written. Even if either one of the disks cannot be accessed upon failing, therefore, the other disk can be accessed to read out the data. Further, the data are read out in a parallel manner. In a normal case where there is no fault, therefore, read time is shortened, thereby making it possible to read out the data at higher speed. Further, when a reading block is large, the speed at which the data are read out of the disk (the recording surface) is also increased.

According to a third aspect, within the first aspect, each of the recording surfaces of the plurality of disks is partitioned into two regions having the same shape and capacity, the disks are divided into two groups respectively comprising a group of the one regions and a group of the other regions over the plurality of recording surfaces, and the two groups are respectively constructed as logical disks, the control means carrying out control such that the mirrored data are written and read to and from the two logical disks constructed.

As described above, within the third aspect, the content of one disk is logically divided into two, to constitute two logical sub-disks, within the first aspect. The mirrored data are written into the two logical sub-disks (recording surfaces) for each data to be written. Even if either one of the disks cannot be accessed upon failing, therefore, the other disk can be accessed to read out the data. Further, the data are read out in a parallel manner. In a normal case where there is no fault, therefore, read time is shortened, thereby making it possible to read out the data at higher speed.

According to a fourth aspect, within the first to third aspects, when each of the tracks on the plurality of recording surfaces is partitioned into an even number of sectors, the phase difference is 180 degrees.

According to a fifth aspect, within the first to third aspects, when each of the tracks on the plurality of recording surfaces is partitioned into an odd number of sectors, the phase difference is an angle of approximately 180 degrees at the head of the sector.

As described above, in the fourth and fifth aspects, the same data are written into positions having a phase difference of 180 degrees or approximately 180 degrees on the two different disks (logical disks). In a normal case where there is no fault, therefore, average rotational latency in data reading is reduced to half of the conventional time, and read time is also shortened, thereby making it possible to read out the data at higher speed.

A sixth aspect is directed to a data processing method for writing data to parallel tracks repeatedly passing respective positions for conversion in a plurality of disks, respectively, wherein with respect to the plurality of disks which are rotated in synchronization with each other, mirrored data are written into positions on the same cylinder on the plurality of disks, on different recording surfaces, and have a predetermined phase difference around respective rotation axes of the plurality of disks.

As described above, in the sixth aspect, the mirrored data are written into the two different disks (recording surfaces) for each data to be written. Even if either one of the disks cannot be accessed upon failing, therefore, the other disk can be accessed to read out the data. Further, the data are read out in a parallel manner. In a normal case where there is no fault, therefore, read time is shortened, thereby making it possible to read out the data at higher speed.

A seventh aspect is directed to a data processing method for reading out data from parallel tracks repeatedly passing respective positions for conversion in a plurality of disks, respectively. The plurality of disks are rotated in synchronization with each other and have mirrored data written into positions on the same cylinder, on their different recording surfaces, and have a predetermined phase difference around their respective rotation axes. The mirrored data which have been written into the different recording surfaces are read out in a parallel manner.

As described above, in the seventh aspect, the mirrored data written into the two different disks (recording surfaces) are used. Even if either one of the disks cannot be accessed upon failing, the other disk can be accessed to read out the data. Further, the data are read out in a parallel manner. In a normal case where there is no fault, therefore, read time is shortened, thereby making it possible to read out the data at higher speed.

According to an eighth aspect, within the sixth aspect, the plurality of disks are divided into two groups by the recording surface when the disks are even in number, to respectively construct the two groups as logical disks, and the mirrored data are written into the two logical disks constructed.

As described above, within the eighth aspect, the content of one disk is logically divided into two, to constitute two logical sub-disks in the sixth aspect. The mirrored data are written into the two logical sub-disks (recording surfaces) for each data to be written. Even if either one of the disks cannot be accessed upon failing, therefore, the other disk can be accessed to read out the data. Further, the data are read out in a parallel manner. In a normal case where there is no fault, therefore, read time is shortened, thereby making it possible to read out the data at higher speed. Further, when a reading block is large, the speed at which the data are read out of the disk (the recording surface) is increased.

According to a ninth aspect, within the sixth aspect, each of the recording surfaces of the plurality of disks is partitioned into two regions having the same shape and capacity, the disks are divided into two groups respectively comprising a group of the one regions and a group of the other regions over the plurality of recording surfaces, to respectively construct the two groups as logical disks, and the mirrored data are written into the two logical disks constructed.

As described above, within the ninth aspect, the content of one disk is logically divided into two, to constitute two logical sub-disks, within the sixth aspect. The mirrored data are written into the two logical sub-disks (recording surfaces) for each data to be written. Even if either one of the disks cannot be accessed upon failing, therefore, the other disk can be accessed to read out the data. Further, the data are read out in a parallel manner. In a normal case where there is no fault, therefore, read time is shortened, thereby making it possible to read out the data at higher speed.

According to a tenth aspect, within the sixth to ninth aspects, when each of tracks on the plurality of recording surfaces is partitioned into an even number of sectors, the phase difference is 180 degrees.

According to an eleventh aspect, within the sixth to ninth aspects, when each of tracks on the plurality of recording surfaces is partitioned into an odd number of sectors, the phase difference is an angle of approximately 180 degrees at the head of the sector.

As described above, in the tenth and eleventh aspects, the same data are written into positions having a phase difference of 180 degrees or approximately 180 degrees on the two different disks (logical disks). In a normal case where there is no fault, therefore, average rotational latency in data reading is reduced to half of the conventional time, and read time is also shortened, thereby making it possible to read out the data at higher speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram for comparing times required to read out data from recording surfaces in the conventional reading method and a reading method according to the present invention based on FIG. 7.

DESCRIPTION OF THE PREFERRED EMBODIMENT

Figure 1:
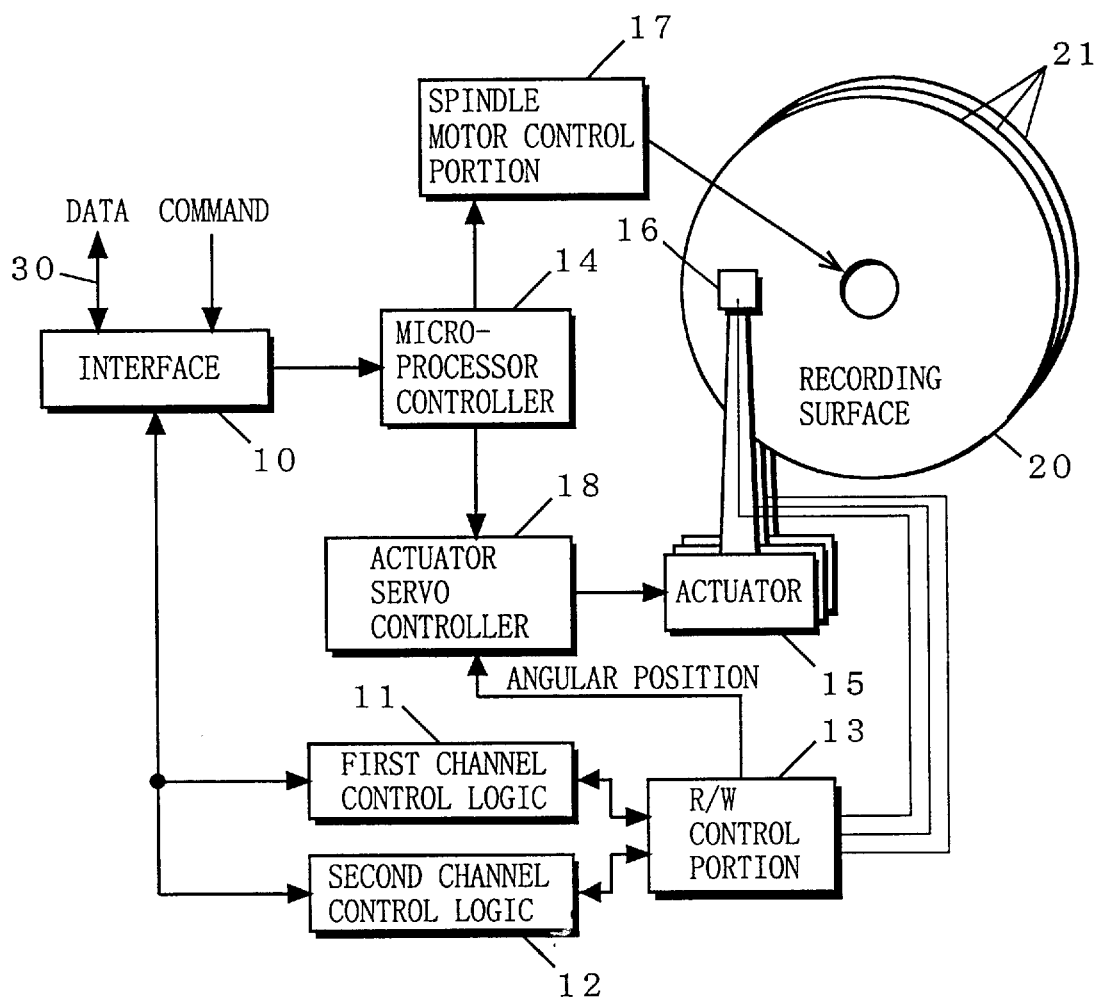
FIG. 1 is a block diagram showing the configuration of a redundant recording disk device according to one embodiment of the present invention.

FIG. 1 is a block diagram showing the configuration of a redundant recording disk device according to one embodiment of the present invention. In FIG. 1, a disk device according to one embodiment of the present invention comprises an interface 10, a first channel control logic 11, a second channel control logic 12, an R/W (Read/Write) control portion 13, a microprocessor controller 14, a plurality of actuators 15, a plurality of recording heads 16, a spindle motor control portion 17, an actuator servo controller 18, a recording medium 20 including a plurality of disks 21, and a data bus 30.

The interface 10 is connected to a host system (not shown) on the data bus 30, and transmits and receives data to be written into the recording medium 20 or data read out of the recording medium 20 in accordance with a given command. The microprocessor controller 14 carries out the overall control of the disk device. The recording medium 20 is constituted by a plurality of disks 21, and each of the disks 21 is previously divided so as to logically constitute two recording mediums 20. The spindle motor control portion 17 controls the rotational speed of the recording medium 20 under an instruction from the microprocessor controller 14. The first channel control logic 11 and the second channel control logic 12 respectively select the recording heads 16 for recording data inputted through the interface 10 and give an instruction to the R/W control portion 13 at the time of writing processing. At the same time, the first channel control logic 11 and the second channel control logic 12 output data read out by parallel processing of the R/W control portion 13 to the interface 10. The data is output in order at the time of reading processing. The R/W control portion 13 instructs the actuator servo controller 18 to position the two recording heads 16 selected by the first and second channel control logic 11 and 12 in conformity with respective tracks on the disks 21 to maintain the boundary between the tracks, and instructs the two recording heads 16 to write data in a parallel manner in predetermined positions at the time of writing processing. The R/W control portion 13 reads out the data designated by the command by parallel processing and outputs the data to the first and second channel control logic 11 and 12 at the time of reading processing. The actuator servo controller 18 controls the plurality of actuators 15 in accordance with an instruction from the R/W control portion 13. The plurality of actuators 15 respectively have the recording heads 16 at their ends, and are operated such that the recording heads 16 can be moved on recording surfaces of the disks 21. The plurality of recording heads 16 respectively write and read data (coded serial data) to and from the recording surfaces of the disks 21 in accordance with control carried by the R/W control portion 13.

The position of each of the recording heads 16 on the disks 21 is detected from a servo head of a drive using a dedicated servo surface, or a signal representing each surface servo information in a sector head of a drive using an integrated servo system or a sector servo system, although the description thereof is not repeated because it is a well-known technique.

A data processing (writing/reading) operation in the disk device according to one embodiment of the present invention configured as described above will be successively described with respect to a case where the number of disks 21 (i.e., recording surfaces) constituting the recording medium 20 is even and a case where it is odd.

(A case where the number of disks 21 is even)

Figure 2:
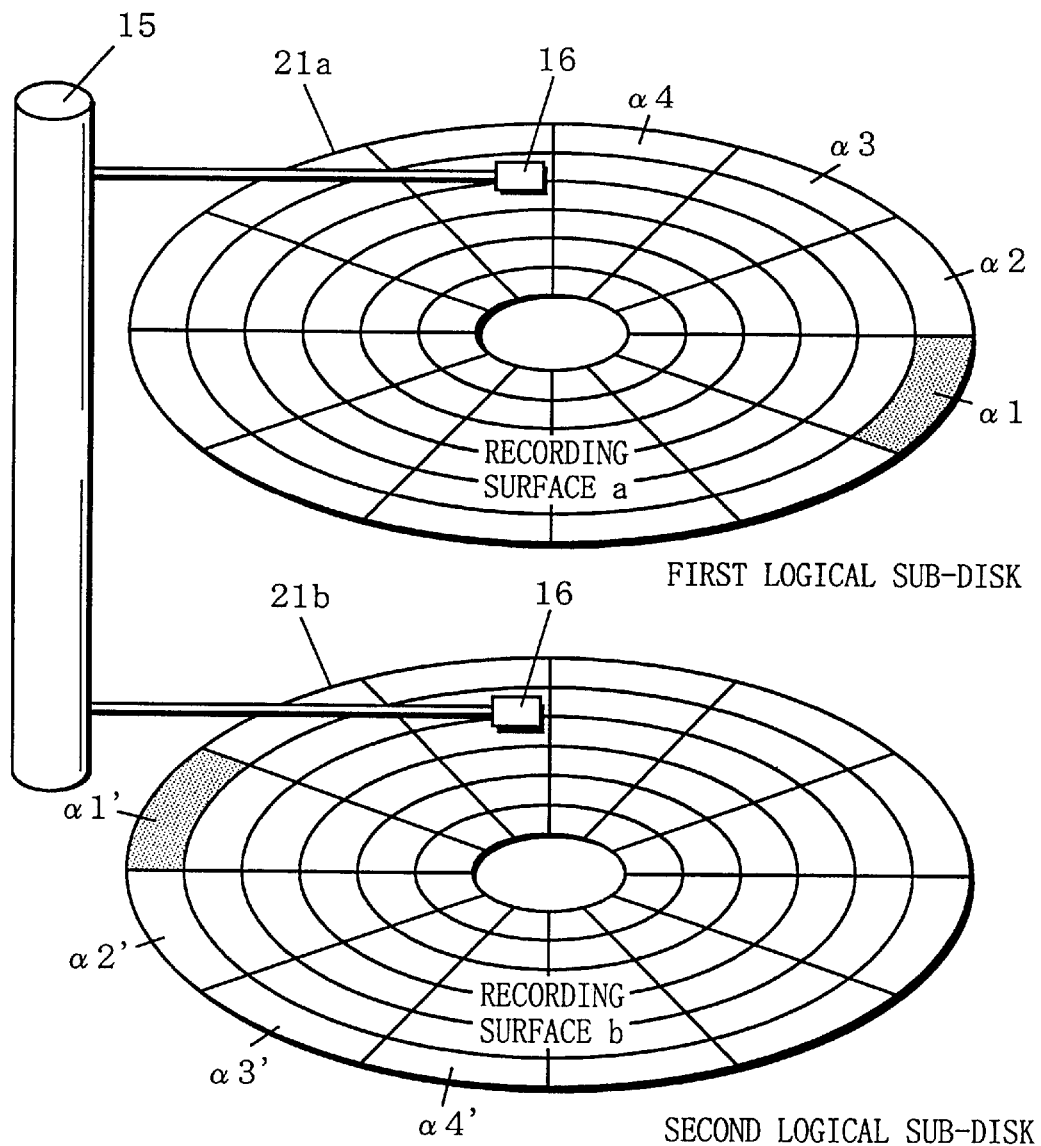
FIG. 2 is a schematic view showing an example of the structure of a recording medium 20 in a case where the number of disks 21 is two.

FIG. 2 is a schematic view showing an example of the structure of the recording medium 20 in a case where the number of disks 21 is two. In FIG. 2, the recording medium 20 constitutes a mirrored disk by taking a disk 21a (a recording surface a) as a first logical sub-disk and taking a disk 21b (a recording surface b) as a second logical sub-disk.

Description is now made of a case where data is written.

In the case of data writing, the disk device writes the same data to both the first logical sub-disk and the second logical sub-disk, that is, writes the mirrored data. At this time, the disk device writes data X to be recorded on the first logical sub-disk and data X to be recorded on the second logical sub-disk into positions on the same cylinder and having a phase difference of 180 degrees around respective rotation axes of the disks. For example, in FIG. 2, data written into blocks α1 to α4 of the disk 21a (the recording surface a) are respectively written into blocks α1' to α4', the respective phases of which are shifted 180 degrees, of the disk 21b (the recording surface b).

If there exist no recording blocks in positions having a phase difference of 180 degrees, for example, if the number of blocks (sectors) in one rotation of the disk is not even, the mirrored data are written into positions having a phase difference closest to 180 degrees.

Description is now made of a case where the mirrored data written in the above-mentioned form are read out. Data 1 to data n (n is an integer not less than one) shall be respectively mirrored and recorded on sectors S1 to Sn on the first logical sub-disk and sectors S1' to Sn' on the second logical sub-disk.

Consider a case where data i (i is an integer not less than one) to data j (j is an integer where i<j≦n) are read out. In this case, the disk device first performs processing for reading out the data i (the sector Si or the sector Si') in the first logical sub-disk (the recording surface a) and the second logical sub-disk (the recording surface b). When the data i is read out from either one of the logical sub-disks, the disk device continues the reading of the subsequent data in each of the logical sub-disks on the basis of the following procedure.

Step 1: The data (the sector) which can be subsequently read out is confirmed in the disk 21a and the disk 21b respectively serving as the first logical sub-disk and the second logical sub-disk.

Step 2: The data (the sector) which can be subsequently read out from each of the disks, which has been confirmed at step 1, and the data which have not been read out yet out of the data i to j are compared with each other, to judge whether or not some of the data coincide with each other.

Step 3: When some of the data coincide with each other at step 2, the data are read out at a maximum of two sectors selected in ascending order of their numbers out of the sectors on which the data which coincide with each other are respectively recorded.

Step 4: When none of the data (the sectors) coincide with each other at step 2, a track to be read is moved to the next track inward, to perform the processing at step 1.

The disk device repeatedly performs the above-mentioned processing, to complete the processing after all the data i to j are read out.

Figure 3:
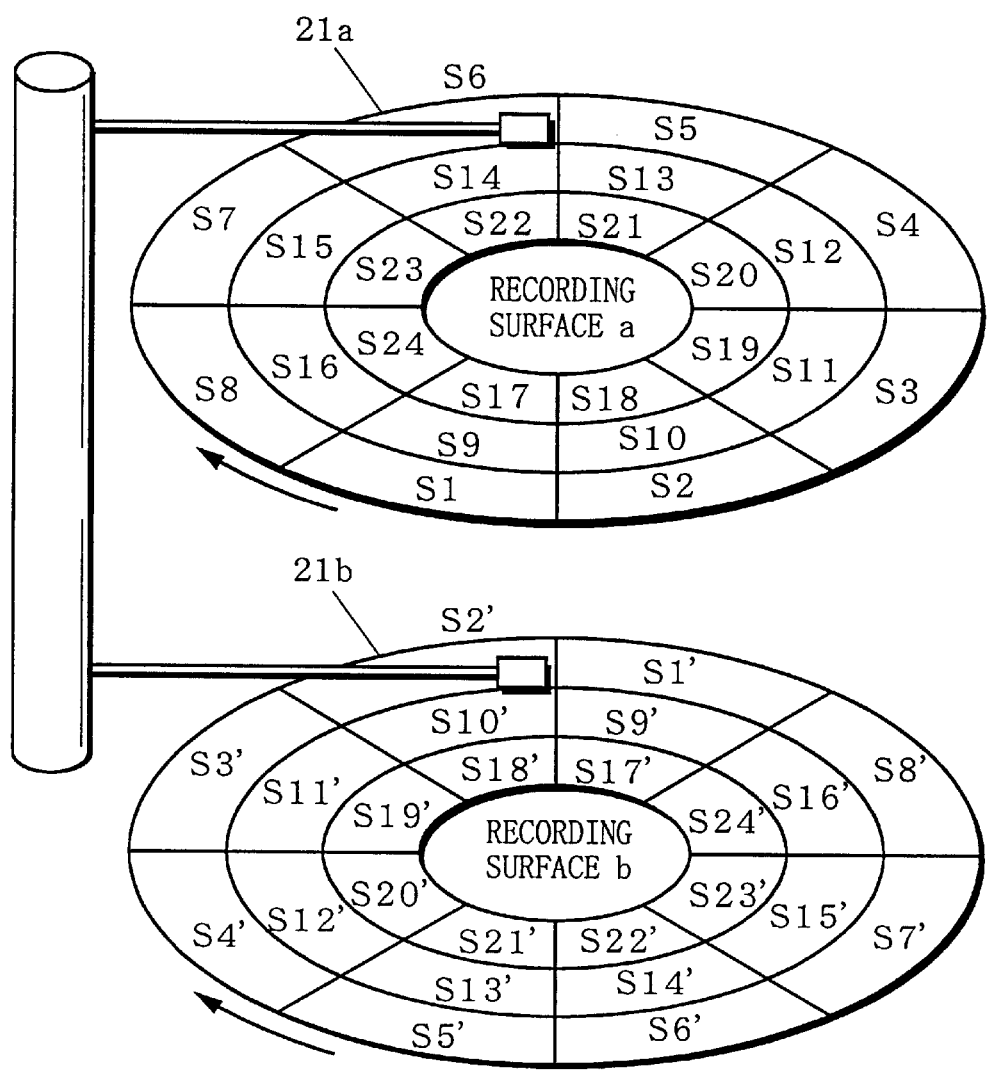
FIG. 3 is a diagram for explaining a method of reading out data from the recording medium 20 having the structure shown in FIG. 2.
Figure 4:
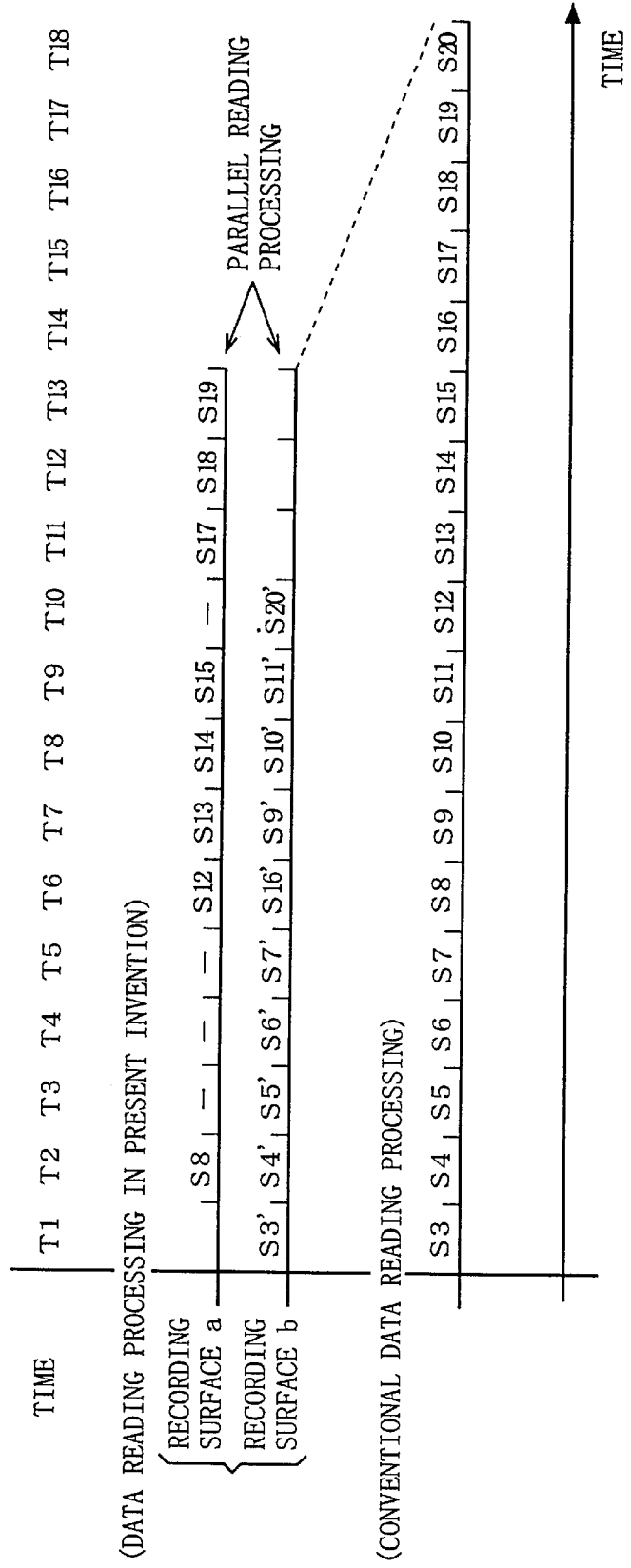
FIG. 4 is a diagram for comparing times required to read out data from recording surfaces in a conventional reading method and a reading method according to the present invention based on FIG. 3.

The above-mentioned reading method will be further specifically described using FIGS. 3 and 4.

FIG. 3 is a diagram for explaining a method of reading out data from the recording medium 20 having the structure shown in FIG. 2. In FIG. 3, on the first logical sub-disk (the disk 21a) and the second logical sub-disk (the disk 21b), one track is partitioned into eight sectors. Data 1 to 24 are respectively mirrored and recorded on sectors S1 to S24 and sectors S1' to S24'. FIG. 4 is a diagram for comparing times required to read out data from the recording surfaces in the conventional reading method with the reading method according to the present invention. FIG. 4 shows a case where data 3 to 20 are read out.

The disk device first performs processing for reading out the data 3 (i.e., the sector S3 or the sector S3') in the first logical sub-disk (the disk 21a) and the second logical sub-disk (the disk 21b). When the reading is started in an initial state shown in FIG. 3, the disk device reads out the first data 3 at the sector S3' on the second logical sub-disk (FIG. 4, time T1).

When the reading of the first data 3 is completed, the disk device then confirms the data (the sector) which can then be read out in each of the disks 21a and 21b. In the example shown in FIG. 3, the data which can then be read out on the disk 21a is the data 8 (the sector S8), and the data which can then be read out on the disk 21b is the data 4 (the sector S4'). The disk device compares the "data 4 to 20" which have not been read yet with the "data 8 and 4", to read out the data 8 and the data 4 in a maximum of two sectors selected in ascending order of their numbers out of the sectors on which the data which coincide with each other are respectively recorded, that is, the sector S8 and the sector S4' (FIG. 4, time T2).

When the reading of the data 8 and the data 4 is terminated, the disk device further confirms the data (the sector) which can then be read out on each of the disks 21a and 21b. In the example shown in FIG. 3, the data which can then be read out on the disk 21a is the data 1 (the sector S1), and the data which can be then read out on the disk 21b is the data 5 (the sector S5'). The disk device compares the "data 5 to 7 and 9 to 20" which have not been read out yet with the "data 1 and 5" and reads out the data 5 in a maximum of two sectors selected in ascending order of their numbers out of the sectors on which the data which coincide with each other are respectively recorded, that is, only the sector S5' (FIG. 4, time T3).

When the processing is continued, the data which can then be read out on the disk 21a is the data 4 (the sector S4), and the data which can then be read out on the disk 21b is the data 8 (the sector S8') at time T6 shown in FIG. 4. The data which have not been read out yet at the time T6 are the "data 9 to 20", which do not coincide with the data which can then be read. In this case, the disk device moves the track to be read on each of the disks 21a and 21b to the next track inward, as described above, to take the data which can then be read out on the disk 21a as the data 12 (the sector S12) and take the data which can then be read out on the disk 21b as the data 16 (the sector 16). Thereafter, the disk device reads out the data 12 and the data 16 from a maximum of two sectors selected in ascending order of their numbers out of the sectors on which the data which coincide with each other are respectively recorded, that is, the sector S12 and the sector S16 (FIG. 4, time T6).

The disk device performs such parallel reading processing, to complete the reading of the data 3 to the data 20 by the time T13.

The procedure for reading out the mirrored data, described above, is shown by way of example. The mirrored data can be, of course, read out using other procedures.

It goes without saying that when either one of the logical sub-disks fails, the data i to the data j (either the sectors i to j or the sectors i' to j') are continuously read out, as in the conventional example, in the other logical sub-disk which does not fail.

(A case where the number of disks 21 is odd)

When the number of disks 21 is odd, it is impossible to divide the disks 21 of the disk unit so as to constitute two logical sub-disks, as in the above-mentioned case where it is even.

Therefore, the following method is used.

Figure 5:
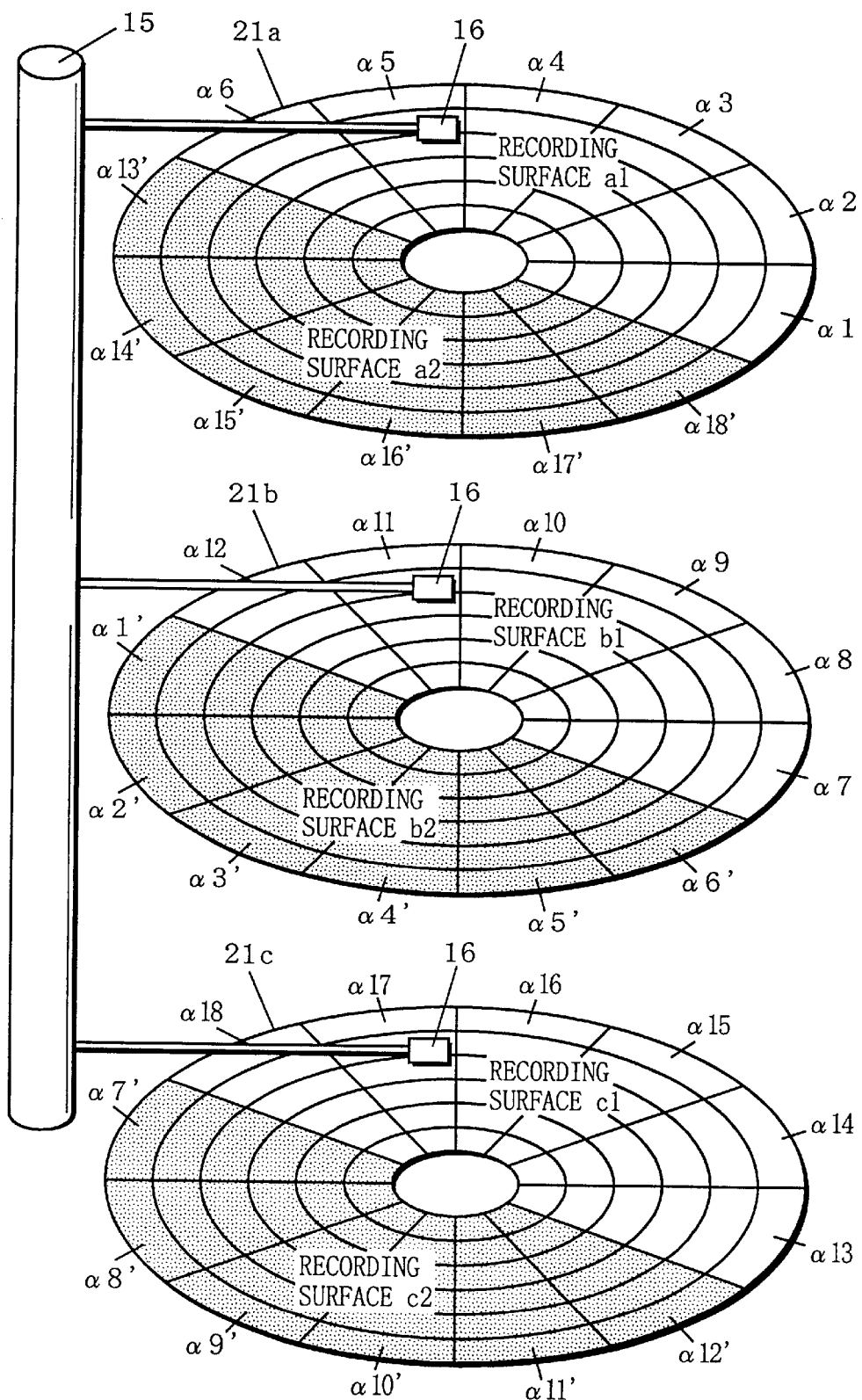
FIG. 5 is a schematic view showing an example of the structure of a recording medium 20 in a case where the number of disks 21 is three.

FIG. 5 is a schematic view showing an example of the structure of a recording medium 20 in a case where the number of disks 21 is three. In FIG. 5, the recording medium 20 constitutes a mirror disk by dividing each of a disk 21a (a recording surface a) to a disk 21c (a recording surface c) into two regions, and taking a group of respective regions in the disks (recording surfaces a1, b1, and c1) as a first logical sub-disk and taking a group of respective other regions in the disks (recording surfaces a2, b2, and c2) as a second logical sub-disk.

Description is first made of a case where data is written.

In the case of data writing, the disk device writes the same data to both the first logical sub-disk and the second logical sub-disk, that is, writes the mirrored data. At this time, the disk device writes data X to be recorded on the first logical sub-disk and data X to be recorded on the second logical sub-disk into positions on the different disks, on the same cylinder, and having a phase difference of 180 degrees around respective rotation axes of the disks. For example, in FIG. 5, data written into blocks α1 to α6 (the recording surface a1) of the disk 21a are respectively written into blocks α1' to α6' (the recording surface b2), the respective phases of which are shifted 180 degrees, of the disk 21b. Similarly, data written into blocks α7 to α12 (the recording surface b1) of the disk 21b are respectively written into blocks α7' to α12' (the recording surface c2), the respective phases of which are shifted 180 degrees, of the disk 21c. Furthermore, data written into blocks α13 to α18 (the recording surface c1) of the disk 21c are similarly respectively written into blocks α13' to α18' (the recording surface a2), the respective phases of which are shifted 180 degrees, of the disk 21a.

Figure 6:
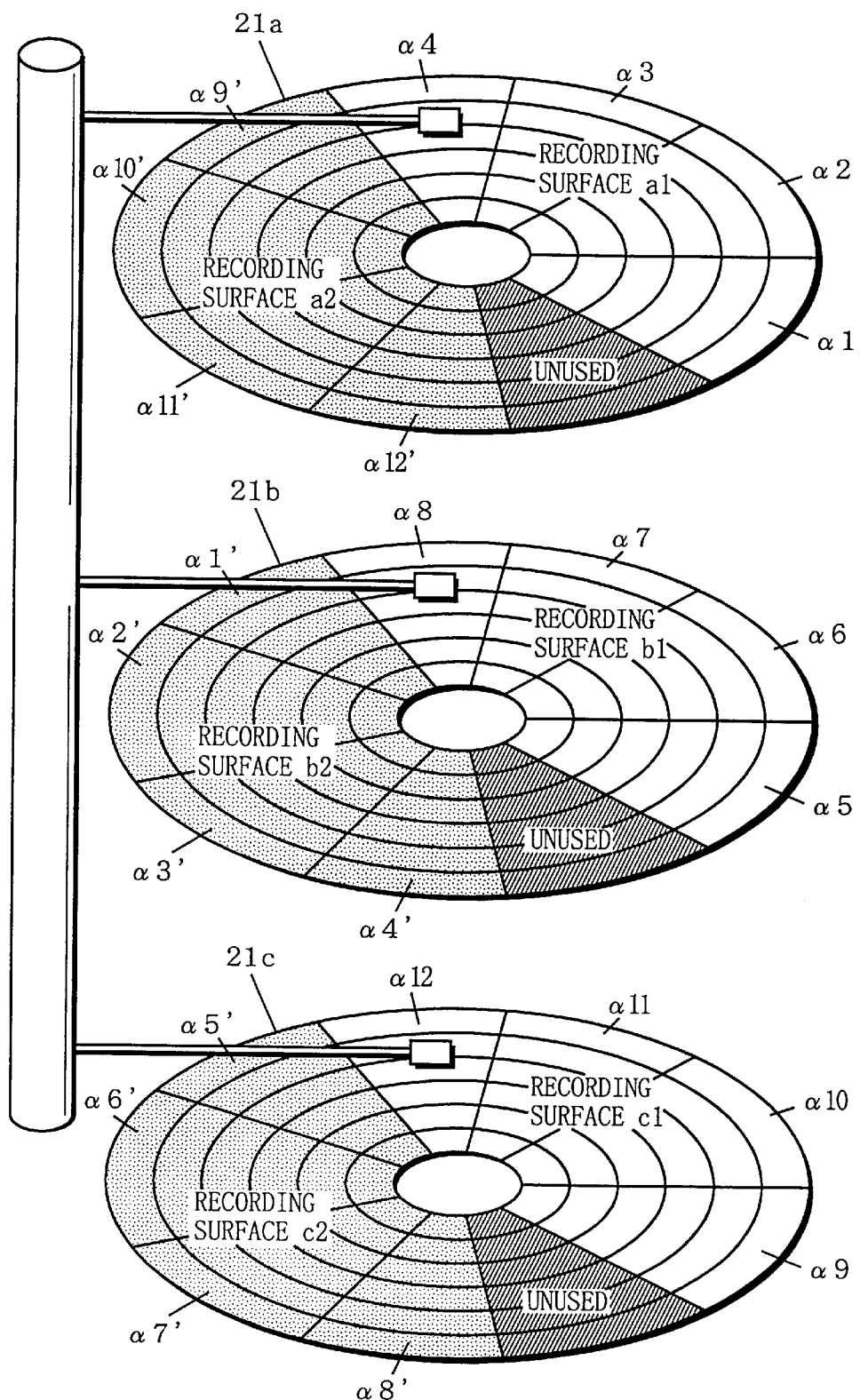
FIG. 6 is a schematic view showing another example of the structure of a recording medium 20 in a case where the number of disks 21 is three.

If there exist no recording blocks in positions having a phase difference of 180 degrees, for example, if the number of blocks (sectors) in one rotation of the disk is not even, as shown in FIG. 6, the mirrored data are written into positions having a phase difference closest to 180 degrees. In this case, a block which does not constitute the logical sub-disk (a hatched portion in FIG. 6) may be left unused.

Description is now made of a case where the mirrored data which have been written in the above-mentioned form are read out.

Basically, a method of reading out mirrored data written in a form in a case where the disks 21 are odd in number is the same as that in a case where the disks 21 are even in number.

Figure 7:
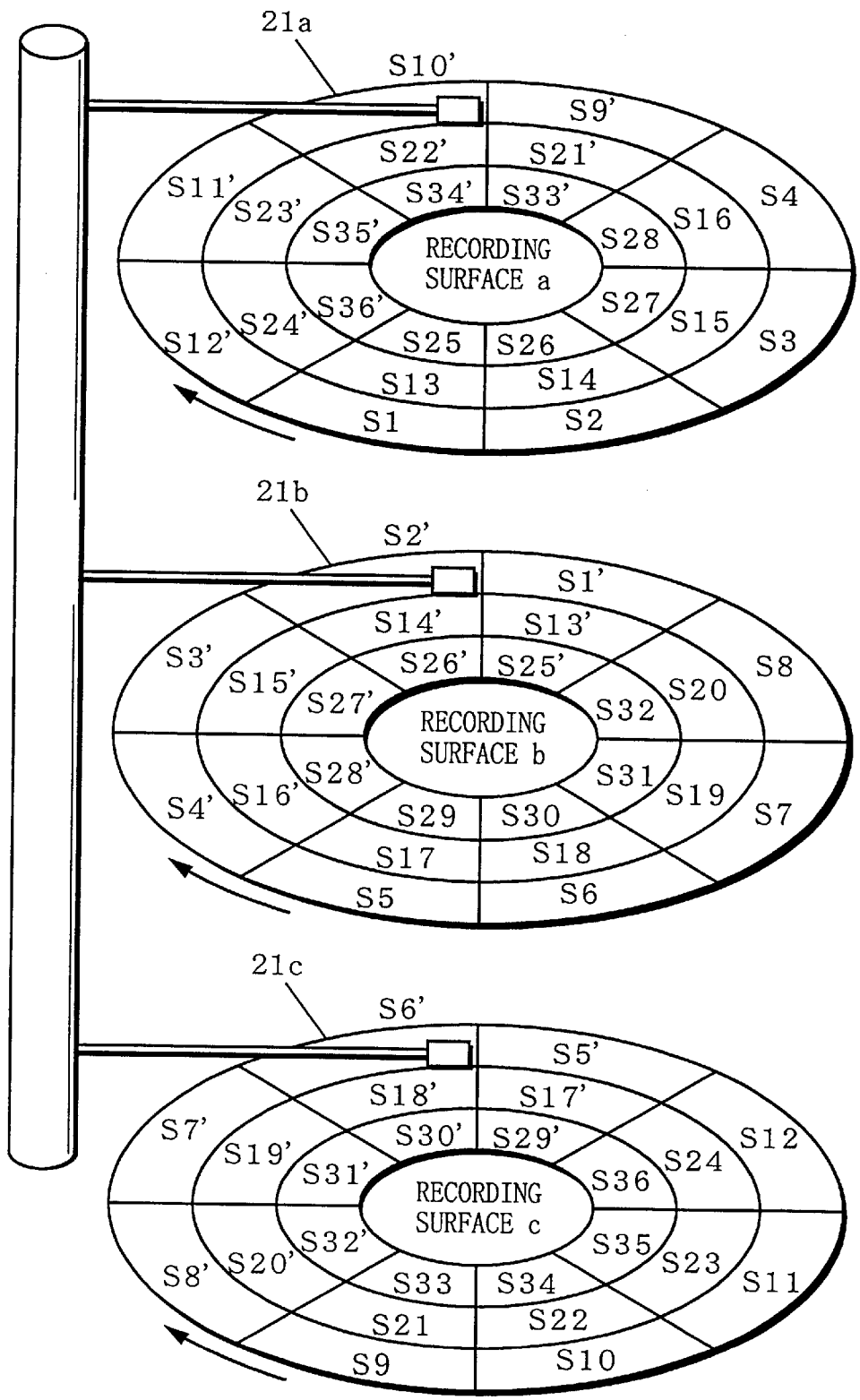
FIG. 7 is a diagram for explaining a method of reading out data from the recording medium 20 having the structure shown in FIG. 5.

Specific examples are illustrated in FIGS. 7 and 8. FIG. 7 is a diagram for explaining a method of reading out data from the recording medium 20 having the structure shown in FIG. 5. In FIG. 7, on the disk 21a, the disk 21b, and the disk 21c, one track is partitioned into eight sectors. Data 1 to 36 are respectively mirrored and recorded on sectors S1 to S36 and sectors S1' to S36'. FIG. 8 is a diagram for comparing times required to read out the data from recording surfaces in the conventional reading method with the reading method according to the present invention. FIG. 8 shows a case where data 3 to 20 are read out.

The disk device first performs processing for reading out the data 3 (i.e., the sector S3 or the sector S3') in the disk 21a, the disk 21b and the disk 21c. When the reading is started in an initial state shown in FIG. 7, the disk device reads out the first data 3 at the sector S3' on the disk 21b which is the second logical sub-disk (FIG. 8, time T1).

When the reading of the first data 3 is completed, the disk device then confirms the data (the sector) which can be then read out in each of the disks 21a to 21c. In the example shown in FIG. 7, the data which can then be read out on the disk 21a is the data 12 (the sector S12'), the data which can be then read out on the disk 21b is the data 4 (the sector S4'), and the data which can be then read out on the disk 21c is the data 8 (the sector S8'). The disk device compares the "data 4 to 20" which have not been read yet with the "data 12, 4 and 8", to read out the data 4 and the data 8 in a maximum of two sectors selected in ascending order of their numbers out of the sectors on which the data which coincide with each other are respectively recorded, that is, the sector S4' and the sector S8' (FIG. 8, time T2).

When the reading of the data 4 and the data 8 is terminated, the disk device further confirms the data (the sector) which can then be read out on each of the disks 21a to 21c. In the example shown in FIG. 7, the data which can then be read out on the disk 21a is the data 1 (the sector S1), the data which can then be read out on the disk 21b is the data 5 (the sector S5), and the data which can then be read out on the disk 21c is the data 9 (the sector S9). The disk device compares the "data 5 to 7 and 9 to 20" which have not been read out yet with the "data 1, 5 and 9" and reads out the data 5 and the data 9 in a maximum of two sectors selected in ascending order of their numbers out of the sectors on which the data which coincide with each other are respectively recorded, that is, the sector S5 and the sector 9 (FIG. 8, time T3).

The disk device similarly continues to perform parallel reading processing, to complete the reading of the data 3 to the data 20 by the time T10.

As described in the foregoing, according to the redundant recording disk device in the first embodiment of the present invention, the content of one disk is logically divided into two, to constitute two logical sub-disks. The mirrored data are written into the two logical sub-disks (recording surfaces) for each data to be written.

Even if either one of the disks cannot be accessed upon failing, therefore, the other disk can be accessed to read out the data. Further, the same data are written into positions having a phase difference of 180 degrees or approximately 180 degrees on the two logical sub-disks. In a normal case where there is no fault, therefore, average rotational latency in data reading is reduced to half of the conventional time, and read time is also shortened, thereby making it possible to read out the data at higher speed. Further, when a reading block is large, the speed at which the data are read out of the disk (the recording surface) is also increased.

In the above-mentioned embodiments, description was made of a case where two disks 21a to 21b are used as a case for example where the number of disks 21 constituting the recording medium 20 is even, and a case where three disks 21a to 21c are used as a case for example where the number of disks 21 is odd. However, the disk device according to the present invention is not limited to two or three disks. A recording medium 20 which is constituted by three or more disks may be used, in which case the same effect as the above-mentioned effect can be produced. In this case, a plurality of disks can be freely divided if two logical sub-disks can be constructed.

If mirrored data can be recorded in positions on the same cylinder, on different disks (recording surfaces), and having a phase difference of approximately 180 degrees, it is not necessary to record the data in continuous blocks on each of the recording surfaces for constituting logical sub-disks (groups), as shown in FIGS. 2 and 5. The data may be recorded in alternate blocks, for example.

Furthermore, in a normal case where there is no fault, when average rotational latency in data reading does not need to be reduced to half of the conventional time, a phase difference between the positions where mirrored data are recorded can also be set to an arbitrary angle (excluding 0 degrees).

While the invention has been described in detail, the foregoing description is in all aspects illustrative and not restrictive. It is understood that numerous other modifications and variations can be devised without departing from the scope of the invention.

What is claimed is:

1. A redundant recording disk device comprising:

a plurality of disks operable to rotate in synchronization with each other around respective rotation axes;

a plurality of recording heads respectively corresponding to said plurality of disks operable to write data to and read data from a first logical recording surface and a second logical recording surface among said disks, wherein the data includes data 1 to data n, where n is an integer not less than one; and control means for:

detecting and controlling positions of said recording heads on said first and second logical recording surfaces;

controlling the writing and reading of the data;

when the data 1 to data n is written, controlling writing such that the data 1 to data n is duplicated into first mirrored data 1 to first mirrored data n and second mirrored data 1 to second mirrored data n and the first mirrored data 1 to first mirrored data n is written into a plurality of consecutive sector positions, respectively, at a radius on said first logical recording surface and the second mirrored data 1 to second mirrored data n is written into a plurality of consecutive sector positions, respectively, at the radius on said second logical recording surface, wherein the plurality of consecutive sector positions have a predetermined phase difference around the rotation axes of said disks, and the plurality of consecutive sector positions on said second logical recording surface are offset by a predetermined phase-offset from the plurality of consecutive sector positions, respectively, on said first logical recording surface; and when data i to data j from the data written on said first and second logical recording surfaces is designated by a command to be read, where i is an integer not less than one, j is an integer, and i<j, controlling reading such that the first and second mirrored data are read until the data i is read, after the data i is read from one of the sector positions on said first logical recording surface or one of the sector positions on said second logical recording surface, determining which of the data i to data j is written in the next one of the sector positions on both the first and second logical recording surfaces, and reading the data in said next one of the sector positions on the first logical recording surface if the data in said next one of the sector positions on the first logical recording surface has not already been read and reading the data in said next one of the sector positions on the second logical recording surface if the data in said next one of the sector positions on the second logical recording surface has not already been read until all of the data i to data j are read.

2. The redundant recording disk device according to claim 1, comprising tracks on said disks, partitioned into an even number of sectors, wherein said predetermined phase-offset is 180 degrees.

3. The redundant recording disk device according to claim 1, comprising tracks on said disks, partitioned into an odd number of sectors, wherein said predetermined phase-offset is approximately 180 degrees at sector heads.

4. The redundant recording disk device according to claim 1, wherein when said disks are even in number, said plurality of disks are logically divided into two groups, with each group constituting one of said logical recording surfaces, and the two groups represent respective logical disks, and said control means performs control such that the first and second mirrored data are written to and read from said two logical disks, respectively.

5. The redundant recording disk device according to claim 4, comprising tracks on said disks, partitioned into an even number of sectors, wherein said predetermined phase-offset is 180 degrees.

6. The redundant recording disk device according to claim 4, comprising tracks on said disks, partitioned into an odd number of sectors, wherein said predetermined phase-offset is approximately 180 degrees at sector heads.

7. The redundant recording disk device according to claim 1, wherein each of said recording surfaces is logically partitioned into a first region and a second region each having the same shape and capacity, the disks are logically divided into two groups respectively comprising a group of the first regions and a group of the second regions, and the two groups represent respective logical disks, and said control means performs control such that the first and second mirrored data are written to and read from said two logical disks, respectively.

8. The redundant recording disk device according to claim 7, comprising tracks on said disks, partitioned into an even number of sectors, wherein said predetermined phase-offset is 180 degrees.

9. The redundant recording disk device according to claim 7, comprising tracks on said disks, partitioned into an odd number of sectors, wherein said predetermined phase-offset is approximately 180 degrees at sector heads.

10. A data processing method for reading out, with recording heads, data from parallel tracks on recording surfaces of a plurality of disks, wherein: the data includes data 1 to data n, where n is an integer not less than one; the plurality of disks are rotated in synchronization with each other around respective rotation axes; the data 1 to data n is duplicated as first mirrored data 1 to first mirrored data n and second mirrored data 1 to second mirrored data n, the first mirrored data 1 to first mirrored data n is written in a plurality of consecutive sector positions, respectively, at a radius on the first logical recording surface and the second mirrored data 1 to second mirrored data n is written in a plurality of consecutive sector positions, respectively, at the radius on the second logical recording surface, the plurality of consecutive sector positions have a predetermined phase difference around the rotation axes of the disks, and the plurality of consecutive sector positions on the second logical recording surface are offset by a predetermined phase-offset from the plurality of consecutive sector positions, respectively, on the first logical recording surface, said method comprising:

when data i to data j from the data written on the first and second logical recording surfaces is designated by a command to be read, where i is an integer not less than one, j is an integer, and i<j, controlling reading such that the first and second mirrored data are read until the data i is read, after the data i is read from one of the sector positions on the first logical recording surface or one of the sector positions on the second logical recording surface, determining which of the data i to data j is written in the next one of the sector positions on both the first and second logical recording surfaces, and reading the data in said next one of the sector positions on the first logical recording surface if the data in said next one of the sector positions on the first logical recording surface has not already been read and reading the data in said next one of the sector positions on the second logical recording surface if the data in said next one of the sector positions on the second logical recording surface has not already been read until all of the data i to data j are read.

11. The data processing method according claim 10, wherein when each of the tracks on the plurality of recording surfaces is partitioned into an even number of sectors, the predetermined phase-offset is 180 degrees.

12. The data processing method according to claim 10, wherein when each of the tracks on the plurality of recording surfaces is partitioned into an odd number of sectors, the predetermined phase-offset is approximately 180 degrees at sector heads.

13. The data processing method according to claim 10, wherein when the disks are even in number, the plurality of disks are logically divided into two groups, with each group constituting one of the logical recording surfaces, and the two groups represent respective logical disks, and the first and second mirrored data are written to and read from the two logical disks.

14. The data processing method according claim 13, wherein when each of the tracks on the plurality of recording surfaces is partitioned into an even number of sectors, the predetermined phase-offset is 180 degrees.

15. The data processing method according to claim 13, wherein when each of the tracks on the plurality of recording surfaces is partitioned into an odd number of sectors, the predetermined phase-offset approximately 180 degrees at sector heads.

16. The data processing method according to claim 10, wherein each of the recording surfaces is logically partitioned into a first region and a second region each having the same shape and capacity, the disks are logically divided into two groups respectively comprising a group of the first regions and a group of the second regions, and the two groups represent respective logical disks, and the first and second mirrored data are written to and read from the two logical disks.

17. The data processing method according claim 16, wherein when each of the tracks on the plurality of recording surfaces is partitioned into an even number of sectors, the predetermined phase-offset is 180 degrees.

18. The data processing method according to claim 16, wherein when each of the tracks on the plurality of recording surfaces is partitioned into an odd number of sectors, the predetermined phase-offset is approximately 180 degrees at sector heads.

* * * * *